US006178841B1

(12) United States Patent
Ruckert et al.

(10) Patent No.: US 6,178,841 B1
(45) Date of Patent: Jan. 30, 2001

(54) MANUALLY CONTROLLED OPERATING LEVER

(75) Inventors: Dieter Ruckert, Reilingen; Jorg Hofle, Jugenheim; Tilo Kempf, Mannheim, all of (DE)

(73) Assignee: Deere & Company, Moline, IL (US)

( * ) Notice: Under 35 U.S.C. 154(b), the term of this patent shall be extended for 0 days.

(21) Appl. No.: 09/362,061

(22) Filed: Jul. 28, 1999

(30) Foreign Application Priority Data

Aug. 17, 1998 (DE) .............................................. 198 37 163

(51) Int. Cl.[7] ............................... B60L 3/00; G05G 9/047

(52) U.S. Cl. ......................... 74/471 XY; 74/491; 74/523; 180/271; 180/272; 180/333; 200/61.85

(58) Field of Search ............................... 74/471 XY, 491, 74/523; 180/271, 272, 333; 200/61.85, 61.86

(56) References Cited

U.S. PATENT DOCUMENTS 3,049,188 * 8/1962 Giannetti .............................. 180/272
4,016,684 * 4/1977 Urda .................................. 74/526 X
4,574,651 * 3/1986 Nordstrom ...................... 74/471 XY
5,042,314 * 8/1991 Rytter et al. ........................... 74/335
5,257,673 * 11/1993 Sato et al. ........................... 180/271
5,383,875 * 1/1995 Bays et al. ............................... 606/1

* cited by examiner

*Primary Examiner*—Allan D. Herrmann

(57) ABSTRACT

A manually controlled operating lever for a vehicle operator's platform has an electrical actuation transducer for transmitting control signals to a working function as a function of the pivoting of the lever and/or as a function of the actuation of at least one actuation element arranged on the lever. In order to avoid an undesired release of working functions, a manually operated activating element is mounted near a hand grip of the lever, and is coupled to a switching element which operates to activate the actuation transducer for the transmission of control signals as a function of actuation of the activating element.

15 Claims, 3 Drawing Sheets

MANUALLY CONTROLLED OPERATING LEVER

BACKGROUND OF THE INVENTION

The invention relates to a manually controlled operating lever, in particular for the operator's platform of a vehicle, with at least one electric actuation transducer for the generation of control signals to at least one working function as a function of the pivoting of the lever and/or as a function of the actuation of an actuating element arranged on the lever.

For the actuation of the working functions, a multitude of manually controlled operating levers are found on the operator's platform of utility vehicles. These levers can be used, for example, to operate implements, such as front loaders. To an increasing degree these levers operate not only through mechanical linkages, but they contain switches or other electrical actuation transducers which transmit electrical control signals as a function of actuation of the lever, in order to control the working functions as desired by the operator. Manually controlled operating levers are known that are equipped with push button switches in the region of the operating handgrip, which interact with an actuation transducer configured as a switching element. A modem manually controlled operating lever moves relatively easily and can be actuated with very little force. This increases the danger of an undesired actuation and control of the working functions. An unintentional actuation and control of a working function can occur, for example, if a piece of the operators clothing catches on the manually controlled operating lever and pivots the latter without the operator noticing the movement. An unintentional actuation of the lever can actuate working functions unexpectedly, resulting in dangerous situations.

SUMMARY OF THE INVENTION

An object of the present invention is to provide a manually controlled operating lever which prevents unintentional actuation of working function.

Another object of the present invention is to provide such a lever wherein the actuation of working functions is blocked under certain circumstances.

This and other objects are achieved by the present invention, wherein a manually actuated activating element is provided in the region of the operating handgrip of the manually controlled operating lever and is connected to an electrical switching element. The switching element interacts with an electrical locking control unit or a locking logic circuit in order to activate or deactivate the actuation transducer of the lever for the transmission of control signals as a function of actuation of the activating element. The locking control unit is designed so that control signals from the control element are transmitted to the working function only if the activating element has previously been deliberately actuated. Otherwise the control signals are suppressed.

Thus, the transmission of operating signals to working functions requires an actuation of the manually controlled operating lever or an actuating element as well as the activating element. With an appropriate grasping of the activating element it is very unlikely that the two noted actuations are performed at the same time unintentionally and involuntarily. The danger of an accidental operation is thereby practically eliminated. Preferably, the lever is configured in the form of a joy stick, which can be pivoted in two directions about a universal joint and is forced into its central neutral position by a spring. For each direction of pivoting at least one actuation transducer is provided for the control of at least one associated working function. Manually controlled operating levers configured as joy sticks permit a simple operation of several working functions. Such a joystick type lever is particularly advantageous for the operation of a loader, in particular the loader of an agricultural or industrial utility vehicle. By a forward or backward movement of the joy stick the loader arm of the loader can be lowered or raised and by sideways movement of the joy stick, for example, a shovel or another implement of the loader can be pivoted. An unintentional and unexpected actuation of the loader arm and the implement must be prevented, since personnel can be present in the region of the loader.

Preferably, push button switches may be used, for example, for the operation of a loader and may be employed to actuate a lifting device for the loading implement or to close or to open the jaws of a grasping implement. It may be advantageous to provide at least one rocker switch element in the region of the operating handgrip which is connected with at least one actuation transducer configured as a potentiometer for the generation of a control signal corresponding to the rocker position of the rocker switch element. Usually one potentiometer is sufficient, that can control both directions of the rocker switch and whose output signal for the rest position of the rocker switch element is calibrated to a null signal. However a potentiometer may be provided for each direction of the rocker switch element movement. By actuating the rocker switch the oil flow, for example, of a hydraulically operated working function can be controlled in proportion to the position of the rocker switch element. Here the working function may be a hydraulic implement attached to the vehicle (grasping device, lifting device, rotating mechanism).

Preferably, the activating element is connected in a joint to the lever so as to move about a pivot axis. The actuation transducer is activated for the transmission of control signals to the working function only if the activating element is deflected by hand from its rest position against a small force (for example, spring force, gravity force). The deflection and the retention in the deflected position requires only a small force, so that the operator is not impaired by the actuation of the activating element. Preferably, the activating element is configured as a flap and is connected in a joint to the manually controlled operating lever in the shank end region of the operating handgrip over a pivot axis extending transverse to the longitudinal axis of the lever. Also, the lever is designed so that the activating element has a generally L-shaped cross section, where the end of the first leg is connected in a joint to the lever and the end of the second leg is located near the free end of the operating handgrip when the activating element is not actuated and does not project beyond it. At the same time the second leg extends in the vicinity and parallel to the operating handgrip. In order to grasp the operating handgrip, the hand must be inserted between the operating handgrip and the activating element. Due to the close distance between the second leg and the operating handgrip, this is only possible if the second leg pivots away from the operating handgrip, at which point the associated switching element is triggered.

Preferably, the activating element is provided with an actuation device in the vicinity of its connecting joint, such as a projection, which interacts with an actuation pin of the switching element, so that, when the activating element is pivoted outward from its non-operating rest position, the switching element is actuated in order to transmit control signals to a locking control unit.

An electrical control unit evaluates the signals of the actuation transducer and the switching element. The control unit contains a locking control unit and transmits control signals to the associated working functions as a result of the aforementioned signals as a function of an appropriate locking strategy.

Preferably, the electrical control unit receives and evaluates the signals of the actuation transducer, which responds to the pivoting of the lever, as well as the signals of the switching element that is connected to the locking element. The control unit performs an activation of the actuation transducer, that is, a further transmission of signals of the actuating transducer to the associated working function, only if the activating element is triggered (actuated), while the lever is in its neutral position. However, if the lever is initially in a different position than its neutral position, then the actuation transducer is not activated upon an actuation of the activating element. Hence the activation is possible only from the neutral position of the lever. This has the safety related advantage that a movement of the working function (for example, front loader) can only be performed if the lever is moved, but not, for example, if the vehicle ignition is turned on when the lever is in its deflected position.

If the activated lever is pivoted from its neutral position, the activation remains in effect even if the activation element is returned to its rest position. However, a preferred embodiment of the invention provides that the control unit cancels the activation if the activation element is in its rest position (because it was released from the hand) and the lever returns to its neutral position and remains there longer than a predetermined first time interval. The first time interval may, for example, amount up to two seconds, preferably approximately 0.5 seconds. Hence, if the lever returns to its neutral position, then the activation ceases after a short time. To generate control signals it is then necessary to perform a renewed activation, as described above. Upon a brief passage through the neutral position, however, the activation is not canceled if the activation element is not actuated.

In order to exclude any misuse and any circumvention of the locking philosophy, in which the operator fixes the activating element by other assisting means (adhesive tape) in its actuated position, so as to hold the lever permanently in its activated position, a preferred embodiment of the invention provides for the control unit to cancel the activation when, after actuating the activation element the lever returns to this neutral position and remains there longer than a predetermined second time interval. The second time interval amounts preferably to up to three minutes, preferably approximately one minute. However, if the neutral position is passed through only briefly, the activation remains in effect.

DESCRIPTION OF THE PREFERRED EMBODIMENT

Figure 1:
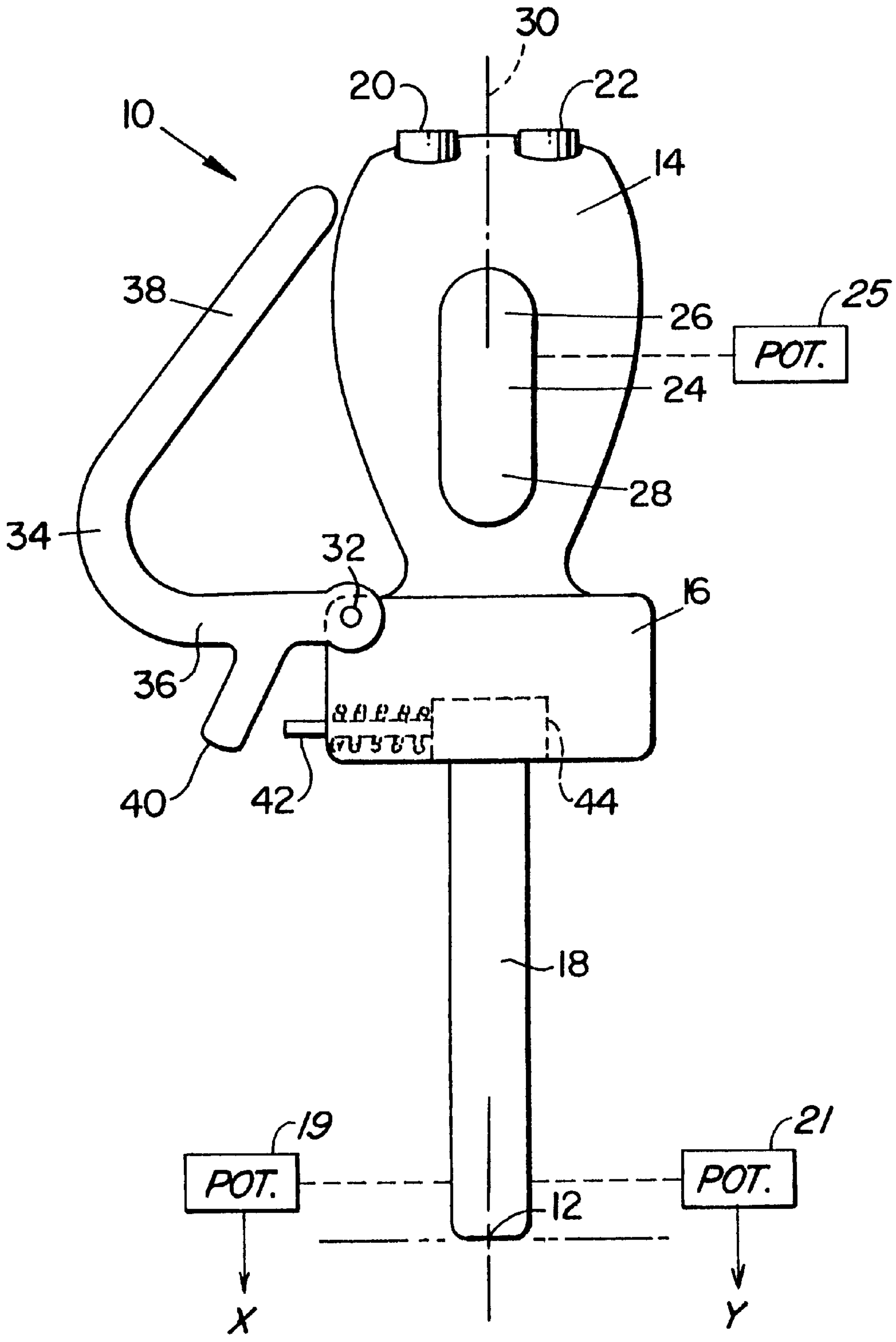
FIG. 1 is a side view of a manually controlled operating lever according to the invention.

FIG. 1 shows a manually controlled operating lever 10. The lever 10 is a spring-centered lever configured in the form of a joy stick that can be pivoted in two directions by means of a universal joint 12, not described in any further detail, to the front and the rear or to the left and right. The lever 10 consists generally of an operating hand grip 14, a central housing 16 and a lever shank 18 located just below the housing 16 whose lower end engages the universal joint 12. The shank 18 of the lever is coupled to actuation transducers 19, 21, such as potentiometers, which generate electrical proportional signals (x, y of FIG. 2) representing the position of the lever 10 along two axis.

Two operating members or push button switches 20, 22 are located on the upward facing end surface of the operating hand grip 14. Switches 20, 22 are associated electrical actuation transducers (not shown in any further detail). With the switches 20, 22 the operator can transmit control signals (z1, z2) in order to switch, for example, between different supplemental functions.

A manually operated rocker member 24 includes an upper rocker leg 26 and a lower rocker leg 28, and is arranged on the side of the hand grip 14 facing away from the operator.

The rocker member 24 is associated with an actuation transducer 25, such as a potentiometer, which transmits control signals to attached implements which are proportional to the rocker position.

In the region of the shank side of the operating hand grip 14 an activating element 34 (safety flap), configured as a flap, is connected in a joint to the housing 16 through a pivot axis 32 extending transverse to the lever axis 30. Element 34 is forced into its rest position shown in FIG. 1 by a spring (not shown), with a low spring force. The activating element or lever 34 has a generally L-shaped cross section with two legs 36, 38. The free end of the first leg 36 together with the pivot axis 32 forms the connecting joint of the activating element 34. The second leg 38 extends at an acute angle towards the longitudinal lever axis 30 and ends in the vicinity of the upper free end of the operating hand grip 14. The free, rounded end of the second leg 38 does not extend beyond the end face of the operating hand grip 14 and therefore does not offer any point of attack for an accidental deflection.

A projection 40 extending downward is formed onto the first leg 36 of the activating element 34. This interacts with the actuating pin 42 of a switching element 44 (such as a micro switch) which is biased by a spring towards the projection 40. In the rest position as shown the projection 40 does not engage the actuating pin 42, so that the latter does not transmit any control signals of the switching element 44.

In order to grasp the operating hand grip 14, the operator inserts his fingers between the activating element 34 and the operating hand grip 14 and forces the activating element 34 from its rest position as shown to the left (as seen in FIG. 1). Thereby the free end of the second leg 38 moves away from the operating hand grip 14. Simultaneously, the projection 40 makes contact with the actuating pin 42 and releases a switching function in the switching element 44. If the operator removes his hand from the operating hand grip 14, then the activating element 34 pivots back into its base position under the force of the spring. Thereby the switching element 44 is switched back and does not transmit any control signal.

Figure 2:
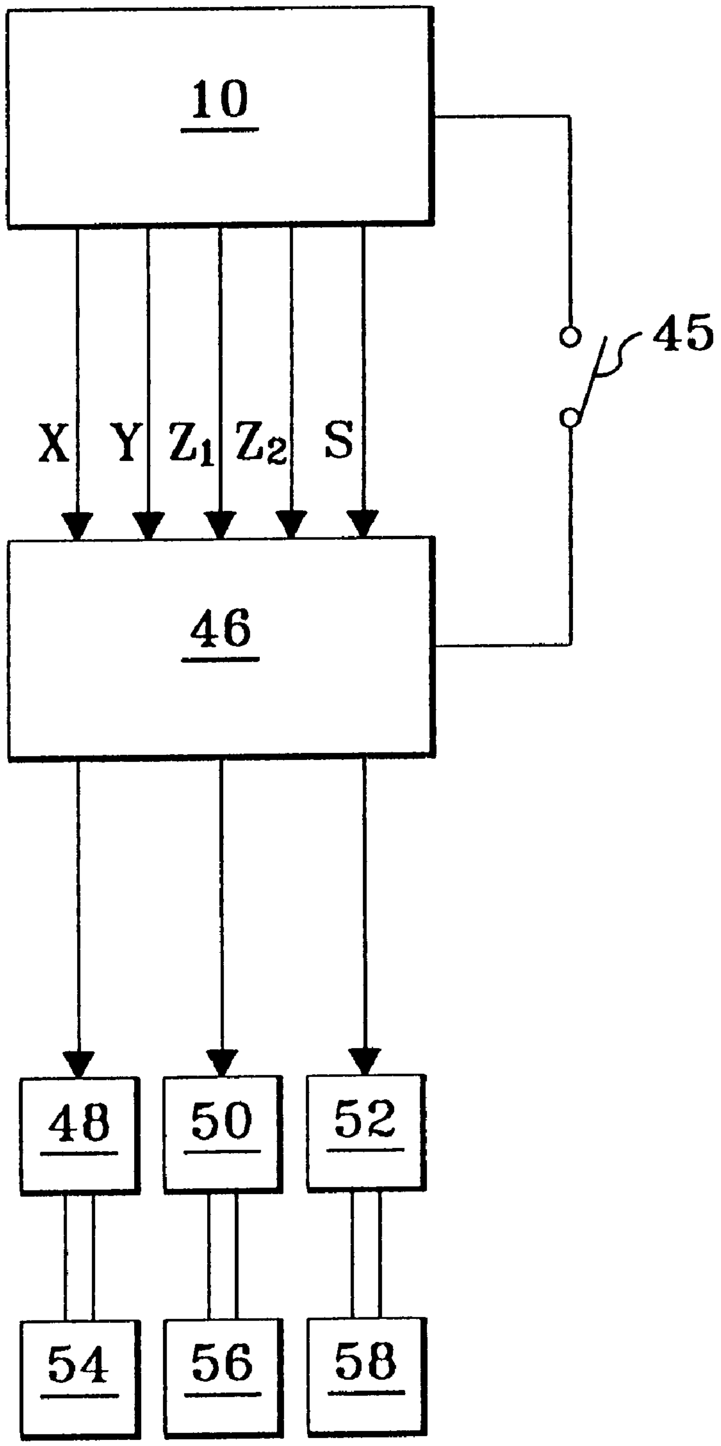
FIG. 2 shows an electrical schematic block diagram for the lever of FIG. 1, showing a control circuit for three working functions.

Furthermore, as seen in FIG. 2, a toggle switch 45 is arranged on the housing 16. Switch 45 can be toggled between an ON and an OFF position in order to switch the lever 10 into the condition in which it is ready to operate.

The signals representing the operating members 20, 22, the transducers 19, 21 and 25, and the switch 44 are evaluated by a control unit 46, which transmits control signals to actuators 48, 50, 52 corresponding to an evaluation algorithm. The actuators 48, 50, 52 control associated hydraulic valves 54, 56, 58 of working functions. The valves 54, 56, 58 are, for example, electro-hydraulic control valves of a front loader. For example, the valve 54 controls the lifting and lowering of a loader arm, not shown, the valve 56 controls the tilting of a grasping device at the free end of the loader arm and the valve 58 controls the opening and closing of the grasping device. The control of a hydraulic attached implement by means of the rocker element 24 is not shown in FIG. 2 in any further detail. The push button switches 20 and 22 may be used to switch between different supplementary functions.

Figure 3:
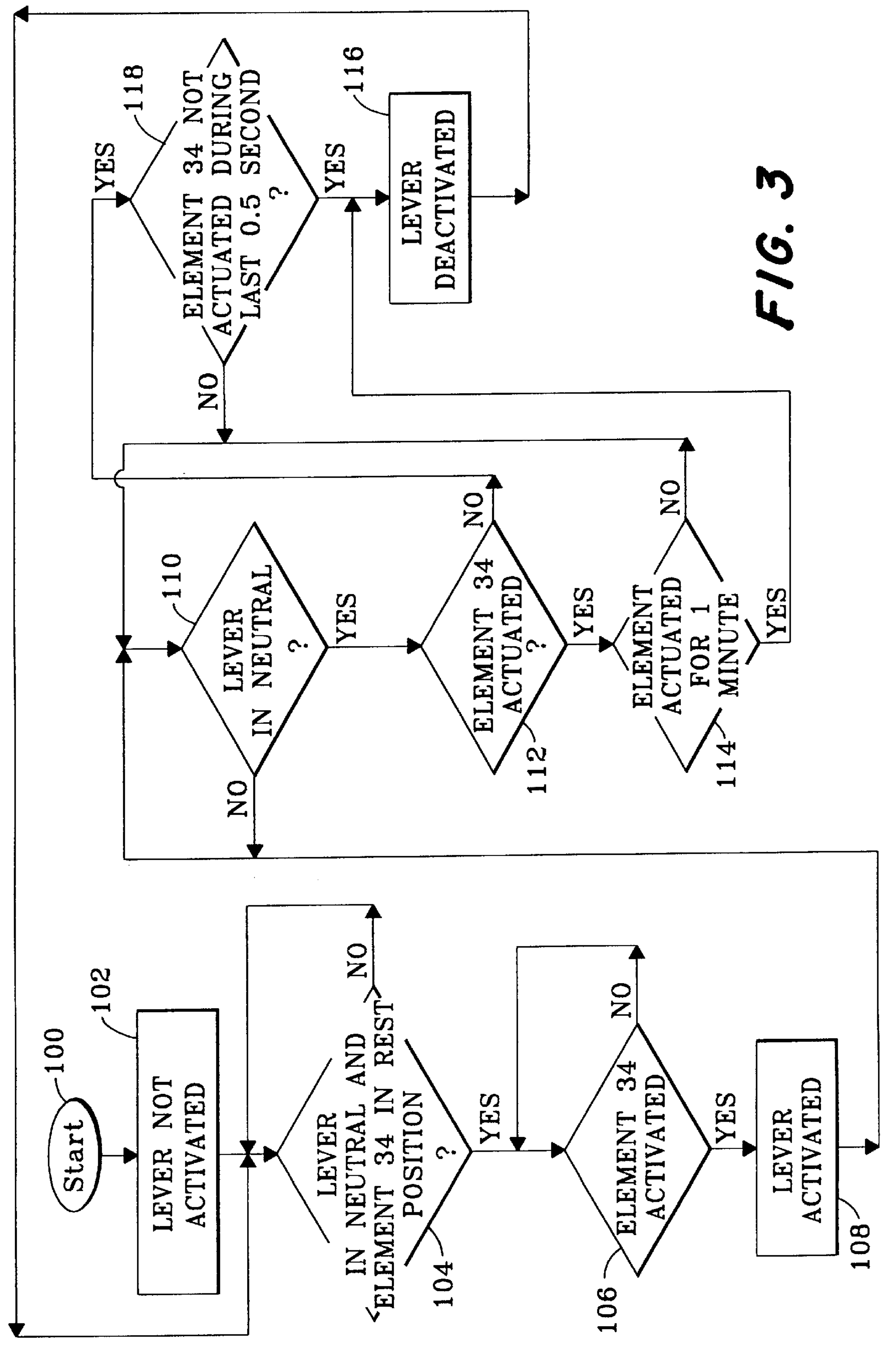
FIG. 3 shows is a logic flow diagram illustrating a method of operation of the present invention.

The control unit 46 executes an algorithm which evaluates the signals received by it. A suitable algorithm is illustrated and explained in connection with the logic flow diagram of FIG. 3. The algorithm begins with the switching of the toggle switch 45 with step 100. In step 102 the lever 10 is not yet activated, that is, the control unit 46 does not convert the signals representing the operating members 20, 22, the transducers 19, 21 and 25 and the switch 44 into control signals for the working functions. Step 104 determines whether the lever 10 is in its neutral position and whether the activating element 34 is in its rest position. As long as these two conditions are not fulfilled, the algorithm repeats step 104 at regular time intervals. If the two conditions of step 104 are fulfilled, the algorithm proceeds to step 106, which determines whether the activating element 34 has been actuated in the interval and has left its rest position. As long as this is not the case, step 106 is repeated at regular time intervals. If an actuation of the activating element 34 is detected by step 106, then the algorithm proceeds to step 108, by means of which the lever 10 is activated.

The lever 10 is now in its operating condition in which control signals are transmitted to associated working functions as a function of its pivoting. Step 110 determines whether the lever 10 is in its neutral position. If this is not the case, the activation of the lever 10 is maintained and step 110 is repeated, and the lever 10 remains in its operating condition, even if the activating element is released and returns to its rest position.

If, however, it is determined in step 110 that the lever 10 is in its neutral position, then the algorithm proceeds to step 112 in which determines whether the activating element 34 is still being actuated.

If the answer to step 112 is positive, then the algorithm proceeds to step 114, which determines whether the activating element 34 has been actuated continuously for the last full minute. If this is the case, then in step 116 the lever 10 is deactivated and the algorithm is returned to step 104. This has the result that when the lever 10 is in its neutral position, it remains activated only if the activating element 34 has been actuated no longer than one minute. Otherwise the activation is canceled. This prevents the activating element 34 from being blocked by unauthorized means, without the operator grasping the lever 10 and simultaneously actuating the activating element 34 with his hand.

If the answer in step 114 is negative, that is, the activating element was not actuated continuously for the last minute, while the operating lever 10 was in its neutral position, then the algorithm returns to step 110 and the lever 10 remains activated.

If it is determined in step 112 that the activating element 34 is no longer actuated, then the algorithm proceeds to step 118, which determines whether the activating element 34 was not actuated during the last half second. If this is the case, then in step 116 the lever 10 is deactivated and the algorithm is returned to step 104. Otherwise, the algorithm returns to step 110. Thus, when the activating element 34 is not actuated, the lever 10 can be moved through its neutral position only briefly without being automatically deactivated. If, however, it remains in its neutral position for a longer period of time (longer than 0.5 seconds), when the activating element 34 is not actuated, then it is deactivated. In this case the interrogation loop must be run again starting with step 104.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A manually controlled operating lever for a vehicle, the lever having a transducer for generating control signals for a working function in response to pivoting of the lever, and having an operating member arranged on the lever, characterized by:

the lever having a hand grip;

a manually operated activating element pivotally mounted near the hand grip; and a switching element operatively coupled to the activating element, the switching element generating control signals in response to actuation of the activating element, the activating element having a generally L-shaped cross section, and comprising a first leg coupled to the lever and a second leg extending from the first leg to a free end, said free end being near the hand grip when the activating element is not actuated, the second lea being forced away from the hand grip when an operator's hand is inserted between the hand grip and the activating element.

2. The lever of claim 1, wherein:

the lever is configured as joy stick which can be pivoted about a universal joint in two directions; and an actuation transducer is provided for each pivoting direction and each actuation transducer being associated with a corresponding working function.

3. The lever of claim 1, wherein:

a push button switch is provided near the hand grip.

4. The lever of claim 1, wherein:

a rocker element is provided near the hand grip, the rocker element being coupled to a potentiometer which generates a control signal corresponding to a position of the rocker element.

5. The lever of claim 1, wherein:

the activating element is pivotally connected to the lever at a pivot joint.

6. The lever of claim 1, wherein:

the activating element comprises a flap pivotally coupled to a shank of the lever about a pivot axis which extending transverse to a longitudinal lever axis.

7. The lever of claim 1, wherein:

the activating element has a projection which is engageable with an actuating pin of the switching element.

8. The lever of claim 1, further comprising:

an electric control unit which receives signals from the transducer and the switching element a generates control signals for working functions as a function of thereof.

9. A manually controlled operating lever for a vehicle, the lever having a transducer for generating control signals for a working function in response to pivoting of the lever, and having an operating member arranged on the lever, characterized by:

the lever having a hand grip;

a manually operated activating element pivotally mounted near the hand grip; and a switching element operatively coupled to the activating element, the switching element generating control signals in response to actuation of the activating element; and an electrical control unit which receives and evaluates signals from the transducer and the switching element, and which responds to the pivoting of the lever, the control unit activating the transducer only if the lever is in a neutral position and the activating element is actuated.

10. The lever of claim 9, wherein:

the control unit cancels an activation if the lever remains in its neutral position without interruption during a first predetermined time interval and the activating element remains in its non-actuated rest position.

11. The lever of claim 10, wherein:

the first time interval has a duration up to 2 seconds, preferably approximately 0.5 seconds.

12. The lever of claim 10, wherein:

the first time interval has a duration of approximately 0.5 seconds.

13. The lever of claim 9, wherein:

the control unit cancels an activation if the lever is in its neutral position longer than a predetermined second time interval while the activating element is actuated.

14. Lever of claim 13, wherein:

the second time interval has a duration of up to 3 minutes, preferably approximately 1 minute.

15. Lever of claim 13, wherein:

the second time interval has a duration of approximately 1 minute.

* * * * *